(12) United States Patent
Matsubara et al.

(10) Patent No.: US 8,007,141 B2
(45) Date of Patent: Aug. 30, 2011

(54) DIFFRACTION OPTICAL ELEMENT, LIGHTING DEVICE, AND PROJECTOR

(75) Inventors: Takayuki Matsubara, Chino (JP); Hidefumi Sakata, Tatsuno-cho (JP)

(73) Assignee: Seiko Epson Corporation, Tokyo (JP)

( * ) Notice: Subject to any disclaimer, the term of this patent is extended or adjusted under 35 U.S.C. 154(b) by 294 days.

(21) Appl. No.: 12/060,407

(22) Filed: Apr. 1, 2008

(65) Prior Publication Data
US 2008/0247167 A1    Oct. 9, 2008

(30) Foreign Application Priority Data

Apr. 3, 2007  (JP) ................. 2007-097193

(51) Int. Cl.
*G02B 27/42* (2006.01)
*F21V 5/00* (2006.01)

(52) U.S. Cl. ......... 362/330; 362/293; 362/332; 359/558

(58) Field of Classification Search .......... 362/268, 362/330, 293, 606, 607, 332; 359/558, 365, 359/366, 369, 576
See application file for complete search history.

(56) References Cited

U.S. PATENT DOCUMENTS

| | | | | |
|---|---|---|---|---|
| 4,892,369 A * | 1/1990 | Moss | ............................ | 359/15 |
| 4,945,529 A * | 7/1990 | Ono et al. | ............... | 369/112.12 |
| 4,983,017 A * | 1/1991 | Tsuji et al. | .................... | 359/566 |
| 5,130,857 A * | 7/1992 | Gupta et al. | ................ | 359/563 |
| 6,323,949 B1 * | 11/2001 | Lading et al. | ................. | 356/477 |
| 6,580,529 B1 * | 6/2003 | Amitai et al. | ................... | 359/13 |
| 6,710,855 B2 * | 3/2004 | Shiraishi | ........................ | 355/67 |
| 6,891,675 B2 * | 5/2005 | Ohyama | ....................... | 359/566 |
| 7,164,842 B2 * | 1/2007 | Chen | ............................ | 385/147 |
| 7,192,175 B2 * | 3/2007 | Parikka et al. | ............... | 362/606 |
| 7,271,956 B2 * | 9/2007 | Ishii | ............................ | 359/569 |
| 7,280,458 B2 * | 10/2007 | Lee et al. | ................. | 369/112.12 |
| 7,554,733 B2 * | 6/2009 | Tokoyoda | .................... | 359/576 |
| 7,573,640 B2 * | 8/2009 | Nivon et al. | .................. | 359/630 |
| 7,583,875 B2 | 9/2009 | Yamauchi et al. | | |
| 7,715,007 B2 * | 5/2010 | Brill et al. | ..................... | 356/399 |
| 7,801,008 B2 * | 9/2010 | Tanaka et al. | ............ | 369/112.03 |
| 2003/0123159 A1 | 7/2003 | Morita et al. | | |
| 2005/0243423 A1 * | 11/2005 | Nakai et al. | ................... | 359/566 |

FOREIGN PATENT DOCUMENTS

| | | |
|---|---|---|
| JP | A 09-068705 | 3/1997 |
| JP | A 11-064789 | 3/1999 |
| JP | A 2001-296417 | 10/2001 |
| JP | A 2002-083759 | 3/2002 |
| JP | A 2002-267825 | 9/2002 |
| JP | A 2003-270585 | 9/2003 |
| JP | A 2007-033576 | 2/2007 |

* cited by examiner

*Primary Examiner* — Jong-Suk (James) Lee
*Assistant Examiner* — Peggy A. Neils
(74) *Attorney, Agent, or Firm* — Oliff & Berridge, PLC

(57) ABSTRACT

A diffraction optical element includes: a first diffraction pattern which diffracts entering light to produce illumination light for illuminating a first area; and a second diffraction pattern which is disposed adjacent to the first diffraction pattern and diffracts entering light to produce illumination light for illuminating a second area other than the first area by using at least a part of the diffracted light.

13 Claims, 9 Drawing Sheets

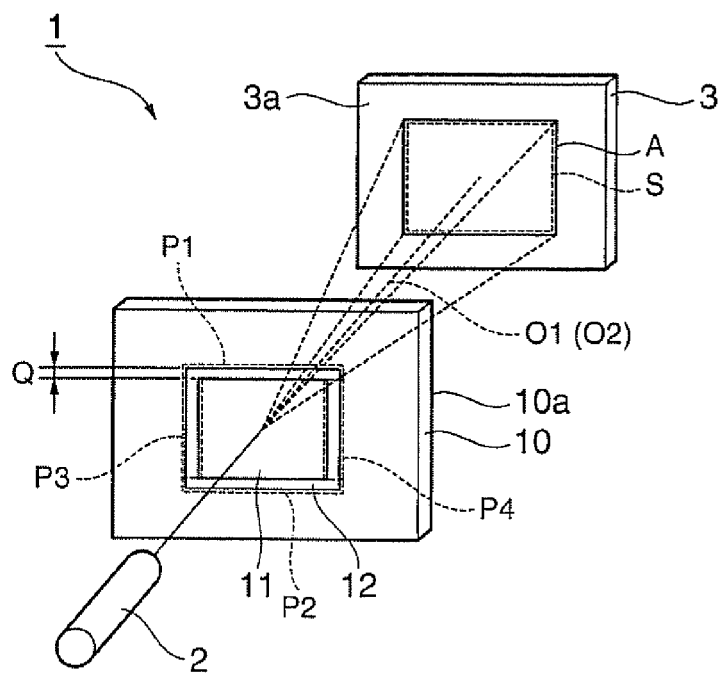
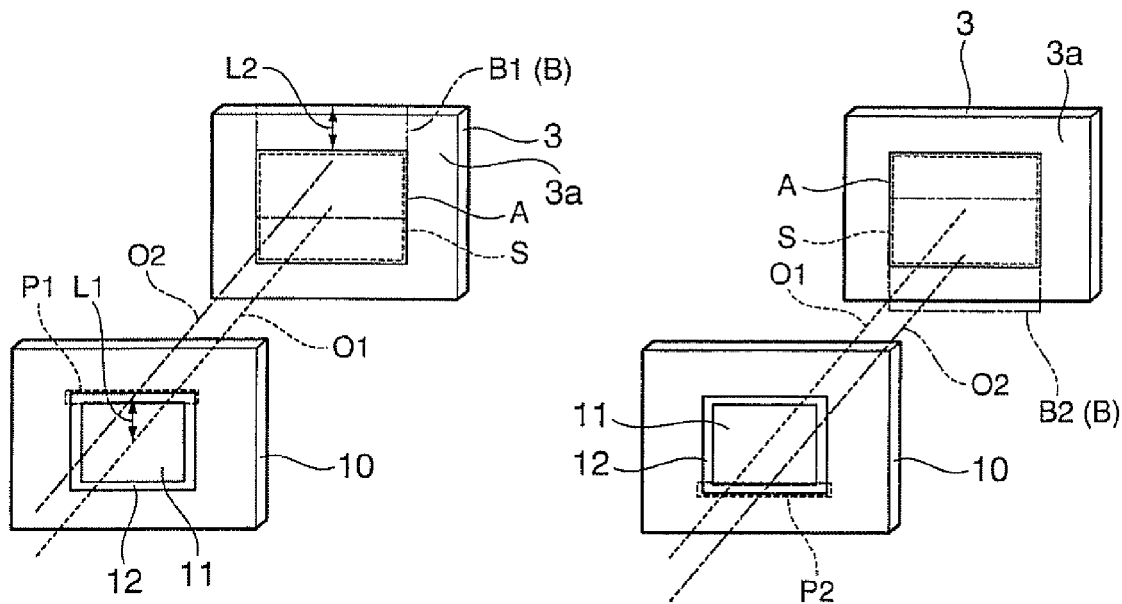
FIG. 1
FIG. 2A  FIG. 2B

DIFFRACTION OPTICAL ELEMENT, LIGHTING DEVICE, AND PROJECTOR

BACKGROUND

1. Technical Field

The present invention relates to a diffraction optical element, a lighting device, and a projector.

2. Related Art

A lighting device of a projector known in the art uses a metal halogen lamp, a halogen lamp, or other lamp. In recent years, however, the use of a semiconductor laser display (LD) is proposed for miniaturization of the lighting device and the projector (for example, see JP-A-11-64789).

A laser display apparatus disclosed in JP-A-11-64789 includes semiconductor lasers for emitting red, green and blue beams, a plurality of collimator lenses for collimating the laser beams emitted from the respective semiconductor lasers, a plurality of microlenses for equalizing intensity distribution of the lights collimated by the collimator lenses, and spatial light modulation devices for modulating the lights released from the respective microlenses.

The advantages of the laser beam sources included in this type of laser display apparatus are high color reproducibility, high luminance, and high contrast of image display, and immediate light emission from the laser beam sources as well as size reduction.

Also, a technology which converges entering light on liquid crystal cells by using a hologram (diffraction optical element) has been proposed (for example, see JP-A-9-68705).

According to the technology disclosed in JP-A-9-68705, however, there is a possibility that the hologram shifts in a direction crossing the center axis of the entering light at the time of assembly of the system including the hologram or due to change with time. More specifically, according to a hologram 200 assembled such that light enters an effective illumination area 201 as illustrated in FIG. 13A, the effective illumination area 201 of the hologram 200 gradually shifts its position with respect to a predetermined illumination area S as illustrated in FIGS. 13B and 13C.

In the condition shown in FIG. 13A, light enters the effective illumination area 201 of the hologram 200. Thus, the light released therefrom illuminates the entire illumination area S. However, in the condition shown in FIG. 13B, light enters the effective illumination area 201 of the hologram 200 with positional disagreement between the effective illumination area 201 of the hologram 200 and the predetermined illumination area S produced. In this case, the entering light illuminates an area out of the predetermined illumination area S. In the condition shown in FIG. 13C where the positional disagreement between the effective illumination area 201 of the hologram 200 and the predetermined illumination area S increases, entering light passes through an area out of the effective illumination area 201, and the predetermined illumination area S receives only light spot. When positional disagreement between the effective illumination area 201 of the hologram 200 and the predetermined illumination area S is produced as in these examples, light utilization efficiency decreases. As a result, unevenness of brightness develops, for example, and image quality thus lowers.

SUMMARY

It is an advantage of some aspects of the invention to provide a diffraction optical element, a lighting device, and a projector, which are capable of preventing decrease in light utilization efficiency even when the diffraction optical element is shifted from a predetermined position.

A diffraction optical element according to a first aspect of the invention includes: a first diffraction pattern which diffracts entering light to produce illumination light for illuminating a first area; and a second diffraction pattern which is disposed adjacent to the first diffraction pattern and diffracts entering light to produce illumination light for illuminating a second area other than the first area by using at least a part of the diffracted light.

According to the diffraction optical element of this aspect of the invention, the position of the diffraction optical element is determined with respect to entering light such that the light enters the first diffraction pattern. However, there is a possibility that light does not enter the first diffraction pattern by the shift of the diffraction optical element in the direction perpendicular to the center axis of the entering light at the time of assembly of the system having the diffraction optical element or due to change with time or for other reasons. According to the diffraction optical element of this aspect of the invention which has the second diffraction pattern adjacent to the first diffraction pattern, light shifted from the first diffraction pattern enters the second diffraction pattern. Then, illumination light generated through the second diffraction pattern and illuminating the second area is applied to the first area.

Thus, even when the diffraction optical element is shifted from the predetermined position, the emitted illumination light can be appropriately applied through the second diffraction pattern without shift from the first area. Accordingly, light utilization efficiency improves.

It is preferable that the second diffraction pattern is disposed in such a position that the illumination position of the second area with respect to the first area is located on the same side as that of the formation area of the second diffraction pattern with respect to the first diffraction pattern.

According to a related-art diffraction optical element, for example, light released from the diffraction optical element is applied to an area above the first area when the diffraction optical element is shifted upward with respect to the entering light. According to the diffraction optical element having the above structure, however, light enters the second diffraction pattern disposed below the first diffraction pattern.

In this case, the second diffraction pattern is disposed in such a position that the illumination direction of the second area with respect to the first area is the same direction as the formation direction of the second diffraction pattern with respect to the first diffraction pattern. As a result, the illumination light illuminating an area below the first area generated through the second diffraction pattern comes to illuminate the first area by the upward shift of the diffraction optical element. Thus, the diffraction angle of the light diffracted by the first and second diffraction patterns is reduced. Accordingly, illumination of the first area can be more efficiently achieved.

It is preferable that a width of the first diffraction pattern in the transverse direction on the plane is substantially equal to the spot diameter of entering light.

According to this structure, the width of the first diffraction pattern in the direction crossing the center axis of entering light is substantially equal to the spot diameter of entering light. In this case, light shifted out of the center axis of the first diffraction pattern immediately enters the second diffraction pattern by only slight shift. Thus, illumination light for illuminating the first area can be generated from entering light with small loss of light.

Accordingly, this structure is effective when the position of entering light is fixed with respect to the first area, that is, when only the diffraction optical element moves with respect to the entering light.

It is preferable that the second diffraction pattern has a plurality of sub diffraction patterns. In this case, it is preferable that each of the sub diffraction patterns produces illumination light applied to an area different from one another.

According to this structure, the second diffraction pattern has the plural sub diffraction patterns. Accordingly, the light entered to the second diffraction pattern due to the positional disagreement passes through one of the different sub diffraction patterns even when the light is slightly shifted. Thus, light shifted from the first diffraction pattern can be formed into illumination light for illuminating the predetermined illumination area with fine adjustment. As a result, more lights having entered the second diffraction pattern of the diffraction optical element can be applied to the first area with further improvement of the light utilization efficiency.

It is preferable that each width of the sub diffraction patterns in a direction crossing the center axis of entering light is smaller than the spot diameter of the entering light.

According to this structure, each width of the sub diffraction patterns in a direction crossing the center axis of entering light is smaller than the spot diameter of the entering light. Thus, light shifted from one of the sub diffraction patterns enters another sub diffraction pattern. Accordingly, illumination light for illuminating the first area can be generated from the entering light with small loss of light.

It is preferable that the first diffraction pattern has a rectangular shape. In this case, it is preferable that the second diffraction pattern is provided at least one of the opposed sides on the outer circumference of the first diffraction pattern.

According to this structure, the second diffraction pattern is provided at least one of the opposed sides on the outer circumference of the first diffraction pattern. Thus, light can be applied to the first area even when the diffraction optical element is shifted in the left-right or up-down direction (two-dimensional direction) on the flat plane in the direction crossing the center axis of the entering light. In this case, the entering light can be easily applied to the first area through the second diffraction pattern even when the light is shifted from the first diffraction pattern due to the positional shift of the diffraction optical element. Thus, the light utilization efficiency improves.

A lighting device according to a second aspect of the invention includes: a light source device which emits light; and the diffraction optical element described above which diffracts light emitted from the light source device. The diffraction optical element produces illumination light for illuminating a predetermined illumination area.

According to the lighting device of this aspect of the invention, light emitted from the light source device enters the diffraction optical element. Then, illumination light diffracted by the diffraction optical element illuminates the first area. In this case, the light utilization efficiency is kept high even when the diffraction optical element is shifted from the predetermined position as described above. Thus, light having high brightness can be applied to the predetermined illumination area.

It is preferable that a shift unit which shifts the diffraction optical element on the plane perpendicular to the center axis of entering light. In this case, it is preferable that the shift unit shifts the diffraction optical element such that light emitted from the light source device enters the first diffraction pattern and the second diffraction pattern.

According to this structure which includes the shift unit for shifting the diffraction optical element, the speckle pattern of the laser beam released from the diffraction optical element varies with time by the shift of the diffraction optical element. In this case, the speckle pattern of the light released from the diffraction optical element is integrated due to after image effect, and scintillation of the light is thus reduced. Accordingly, speckle contrast of the laser beam emitted from the lighting device can be decreased.

Moreover, according to this structure, light illuminating an area out of the predetermined illumination area can be reduced by shifting the diffraction optical element such that the light emitted from the light source device can enter the first and second diffraction patterns. Thus, illumination light having reduced scintillation can be produced without decrease in the light utilization efficiency.

It is preferable that the diffraction optical element is a hologram element.

According to this structure, the hologram element is constituted by a computer generated hologram (hereinafter referred to as CGH) containing interference fringes artificially produced by calculation using a calculator and disposed on a hologram plate, for example. This CGH is a wave front conversion element for converting wave front of entering light by utilizing diffraction phenomenon. Particularly, a phase-type CGH can convert wave front with little loss of energy of entering light wave. Thus, the CGH generating equalized intensity distribution or simple shape intensity distribution can be appropriately used as a component of the lighting device. Moreover, the CGH which freely establishes divisional regions of diffraction gratings is appropriate since no problem is caused by aberration.

It is preferable that the light source device emits a plurality of lights. In this case, it is preferable that the first diffraction pattern of the diffraction optical element has a size sufficient for receiving the plural lights.

According to this structure, light on the end side of the plural lights enters the second diffraction pattern when the diffraction optical element is shifted in the direction perpendicular to the center axis of the entering light. In this case, a part of the plural lights illuminates the first area. Thus, the size of the first diffraction pattern can be determined according to the positions of the plural lights. Accordingly, illumination of the first area can be efficiently achieved even when the light source device emits a plurality of lights.

It is preferable that the light source device emits a plurality of lights. In this case, it is preferable that the first diffraction pattern and the second diffraction pattern of the diffraction optical element are provided for each of the plural lights.

According to this structure, the first diffraction pattern and the second diffraction pattern of the diffraction optical element are provided for each of the plural lights. Thus, the respective lights enter the second diffraction patterns when the diffraction optical element is shifted in the direction perpendicular to the center axis of the entering lights. Thus, at least a part of the light emitted from the plural lights enters the first area. Accordingly, illumination of the first area can be more efficiently achieved.

A projector according to a third aspect of the invention includes: the lighting device described above; a light modulation device which modulates light emitted from the lighting device according to an image signal; and a projection device which projects an image formed by the light modulation device.

According to the projector of this aspect of the invention, light emitted from the lighting device enters the light modulation device. Then, an image formed by the light modulation device is projected by the projection device. In this case, loss of the light emitted from the lighting device caused by the positional shift of the diffraction optical element is reduced. Thus, light having high brightness can be applied to a projection receiving surface.

BRIEF DESCRIPTION OF THE DRAWINGS

The invention will be described with reference to the accompanying drawings, wherein like numbers reference like elements.

FIG. 1 is a perspective view illustrating a lighting device according to a first embodiment of the invention.

FIGS. 2A and 2B are perspective views each of which illustrates an illumination area when light enters a second diffraction pattern of a diffraction optical element shown in FIG. 1.

DESCRIPTION OF EXEMPLARY EMBODIMENTS

Figure 3A:
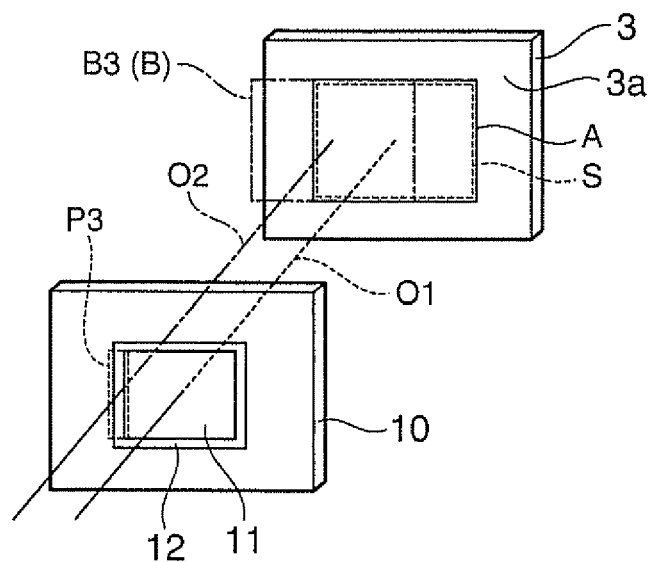
FIGS. 3A and 3B are perspective views each of which illustrates an illumination area when light enters the second diffraction pattern of the diffraction optical element shown in FIG. 1.

A diffraction optical element, a lighting device, and a projector embodying the invention are hereinafter described with reference to the drawings. Reductions in the respective figures are appropriately varied so that respective components have visually recognizable sizes.

First Embodiment

A diffraction optical element and a lighting device including the diffraction optical element according to a first embodiment of the invention are now described with reference to FIGS. 1 through 7.

As illustrated in FIG. 1, a lighting device 1 according to the invention includes a light source device 2 which emits laser beam from one light emitting section, and a diffraction optical element 10 which diffracts the laser beam emitted from the light source device 2. The diffraction optical element 10 produces illumination light for illuminating a predetermined surface 3a of a predetermined member 3.

The diffraction optical element 10 is made of material capable of transmitting laser beam such as quartz (glass) and transparent synthetic resin. The diffraction optical element 10 in this embodiment is a computer generated hologram (CGH).

The diffraction optical element (hologram element) 10 has an illumination area setting function, an illuminance equalizing function, and an enlarging illumination function. The diffraction optical element 10 having the illumination area setting function diffracts entering light and generates illumination light to be applied to the illumination area S of the predetermined surface 3a. The diffraction optical element 10 having the illuminance equalizing function equalizes illuminance of at least a part of the predetermined area. The diffraction optical element 10 having the enlarging illumination function produces an illumination area larger than a light emission area from an emission surface 10a of the diffraction optical element 10 to illuminate the illumination area S of the predetermined surface 3a.

As illustrated in FIG. 1, the diffraction optical element 10 has a rectangular first diffraction pattern 11 formed substantially at the central area, and a second diffraction pattern 12 formed adjacent to the first diffraction pattern 11.

The diffraction optical element 10 is disposed in such a position that a center axis (axis passing through the center of the first diffraction pattern 11 and perpendicular to the surface) O1 of the first diffraction pattern 11 coincides with a center axis O2 of entering light. Light having entered the first diffraction pattern 11 generates illumination light to be applied to a first area A. That is, light having entered the first diffraction pattern 11 at the position of the center axis O1 illuminates the illumination area S of the predetermined surface 3a.

As illustrated in FIG. 1, the second diffraction pattern 12 is disposed along the circumference of the first diffraction pattern 11 in a frame shape. A width Q of the second diffraction pattern 12 in the transverse direction is approximately three times longer than the spot diameter of entering laser beam. The width Q of the second diffraction pattern 12 is only an example, and may be equivalent to or larger than, or equivalent to or smaller than the spot diameter of entering laser beam.

For simplifying explanation of the illumination light of the laser beam entering the second diffraction pattern 12, each position of the center axis O2 of the light entering the diffraction optical element 10 shown in FIGS. 2A and 2B and FIGS. 3A and 3B is varied. However, the positional relationship between the light source device 2 and the illumination area S of the predetermined surface 3a is actually fixed.

As illustrated in FIGS. 2A and 2B, the light having entered the second diffraction pattern 12 generates illumination light to be applied to a second area B. More specifically, the second diffraction pattern 12 has different diffraction patterns for four regions P1, P2, P3 and P4 in the up-down and left-right directions with respect to the first diffraction pattern 11 as illustrated in FIG. 1. Thus, the laser beam emitted from the light source device 2 and entering the upper region P1 of the second diffraction pattern 12 is applied to a second area B1 above the first area A such that a part of the second area B1 overlaps with the first area A as illustrated in FIG. 2A. Similarly, the laser beam emitted from the light source device 2 and entering the lower region P2 of the second diffraction pattern 12 is applied to a second area B2 below the first area A such that a part of the second area B2 overlaps with the first area A as illustrated in FIG. 2B.

Figure 3B:
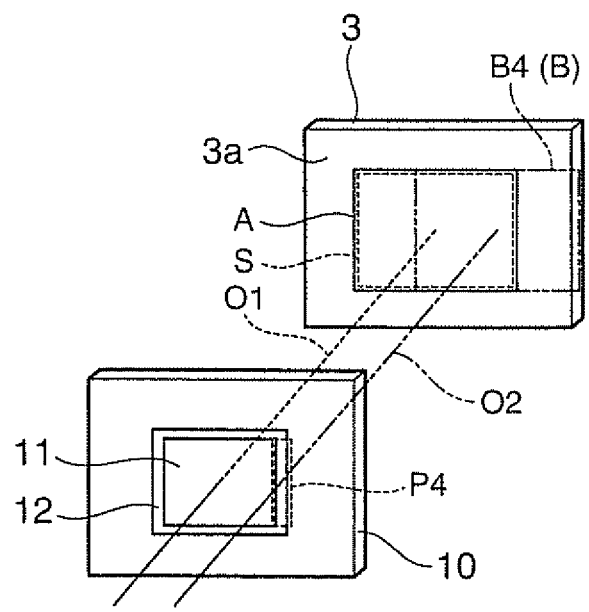

On the other hand, the laser beam emitted from the light source device 2 and entering the left region P3 of the second diffraction pattern 12 is applied to a second area B3 on the left side of the first area A such that a part of the second area B3 overlaps with the first area A as illustrated in FIG. 3A. Similarly, the laser beam emitted from the light source device 2 and entering the right region P4 of the second diffraction pattern 12 is applied to a second area B4 on the right side of the first area A such that a part of the second area B4 overlaps with the first area A as illustrated in FIG. 3B.

As illustrated in FIGS. 2A and 2B, the second diffraction pattern 12 in the region P1 is designed such that a distance L1 between the center of the first diffraction pattern 11 and the region P1 of the second diffraction pattern 12 becomes substantially equal to a distance L2 between the upper side of the illumination area of the first area A and the upper side of the illumination area of the second area B1. In this case, illumination light is generated in accordance with the shift amount of the diffraction optical element 10, and thus laser beam having entered the second diffraction pattern 12 can illuminate substantially the entire illumination area S of the predetermined surface 3a. The regions P2 through P4 of the second diffraction pattern 12 are designed in the same manner.

Thus, the second diffraction pattern 12 is formed such that the illumination direction of the second area B with respect to the first area A is the same direction as the formation direction of the second diffraction pattern 12 with respect to the first diffraction pattern 11.

Figure 4B:
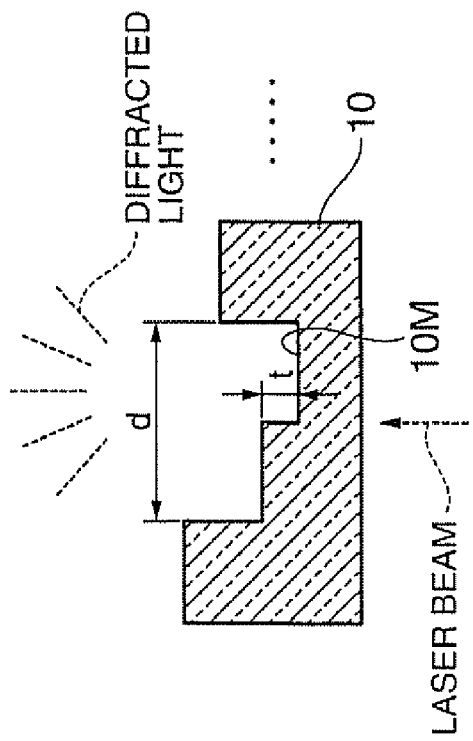
FIG. 4B is a cross-sectional view of FIG. 4A.
Figure 4A:
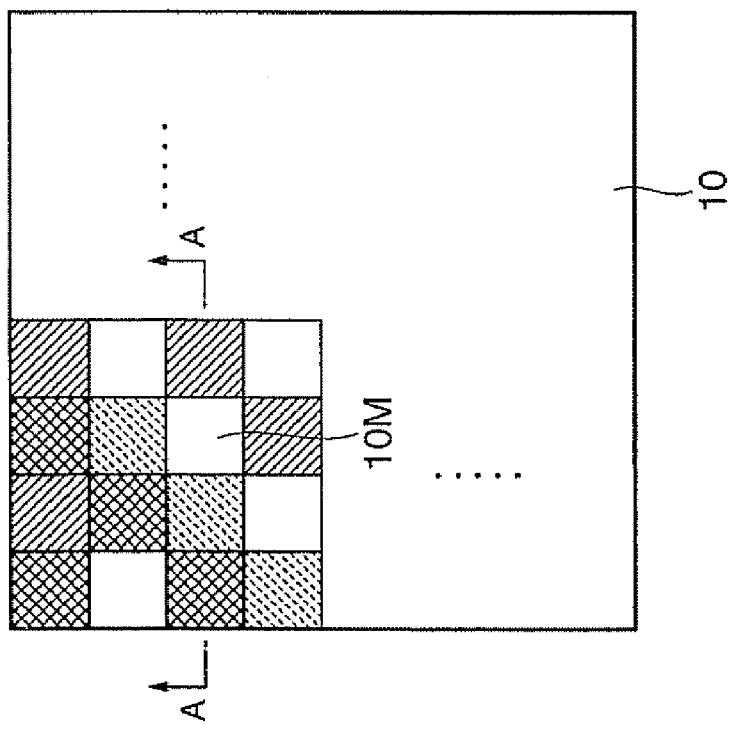
FIG. 4A schematically illustrates the structure of the diffraction optical element shown in FIG. 1.

FIGS. 4A and 4B schematically illustrate an example of the diffraction optical element. FIG. 4A is a plan view, and FIG. 4B is a cross-sectional view taken along a line A-A in FIG. 4A as viewed in the direction of arrows. As illustrated in FIGS. 4A and 4B, a plurality of rectangular concaves (concave and convex structure) 10M are provided on the surface of the diffraction optical element 10. The respective concaves 10 have different depths.

The diffraction optical element 10 obtains the predetermined functions (illumination area setting function, diffusion light generating function, and enlarging illumination function) by appropriately controlling the surface conditions of the diffraction optical element 10 including a pitch d between the adjoining concaves 10M and a depth (height of convexes) t of the concaves 10M. For optimizing the surface conditions, predetermined calculation methods (simulation methods) such as repetitive Fourier calculation or other design methods are used.

The diffraction optical element 10 is not limited to a component having the rectangular concaves 10M but may be a component having a combination of flat surfaces facing in different directions. For example, the diffraction optical element 10 may be a so-called blaze-shaped component having triangular concaves containing slopes. The diffraction optical element 10 may be a component having both an area containing the rectangular concaves 10M shown in FIGS. 4A and 4B and an area containing the triangular concaves. The diffraction optical element 10 having the desired functions can be obtained by optimizing the surface conditions.

The operation of the lighting device 1 having this structure according to the embodiment is now described.

Figure 5:
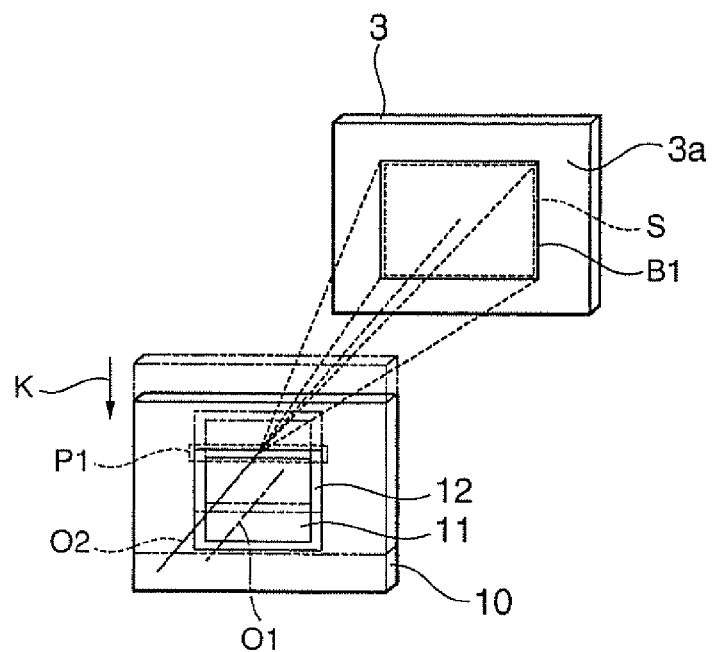
FIG. 5 is a perspective view illustrating operation of the diffraction optical element shown in FIG. 1.

The laser beam emitted from the light source device 2 enters the first diffraction pattern 11 of the diffraction optical element 10. Illumination light diffracted by the first diffraction pattern 11 illuminates the illumination area S of the predetermined surface 3a. It is assumed in this step that the center axis O1 of the diffraction optical element 10 is shifted from the center axis O2 of the entering laser beam in the downward direction of the diffraction optical element 10 (direction indicated by an arrow K) due to change with time as illustrated in FIG. 5, for example. In this case, the laser beam shifted out of the first diffraction pattern 11 enters the region P1 of the second diffraction pattern 12 of the diffraction optical element 10.

In this condition, the laser beam having entered the region P1 of the second diffraction pattern 12 illuminates the second area B1 above the first area A to be illuminated by illumination light applied through the first diffraction pattern 11 as illustrated in FIG. 2A. Since the distance L1 between the center of the first diffraction pattern 11 and the region P1 of the second diffraction pattern 12 is substantially equal to the distance L2 between the upper sides of the illumination areas of the first area A and the second area B1, the illumination light diffracted by the diffraction optical element 10 illuminates the illumination area S of the predetermined surface 3a by the positional shift of the diffraction optical element 10.

According to the diffraction optical element 10 in this embodiment which has the first diffraction pattern 11 and the second diffraction pattern 12, the illumination area S of the predetermined surface 3a can be illuminated by the function of the second diffraction pattern 12 even when the center axis O1 of the diffraction optical element 10 is shifted from the center axis O2 of the laser beam. Thus, illumination of the illumination area S of the predetermined surface 3a can be achieved without decrease in light utilization efficiency even when the diffraction optical element 10 is shifted.

The second diffraction pattern 12 in the respective regions P1 through P4 is disposed in such a position that the illumination direction of the second area B with respect to the first area A is the same as the formation direction of the second diffraction pattern 12 with respect to the first diffraction pattern 11. Thus, the illumination area S of the predetermined surface 3a can be efficiently illuminated.

Since the second diffraction pattern 12 is formed on the circumference of the first diffraction pattern 11, the entering laser beam can easily reach the regions P1 through P4 of the second diffraction pattern 12 without limitation to the direction of the shift of the diffraction optical element 10 on the flat plane perpendicular to the center axis O1. Thus, the entering laser beam can illuminate the illumination area S of the predetermined surface 3a even when shifted from the first diffraction pattern 11. Accordingly, the light utilization efficiency increases.

Since the diffraction optical element 10 is constituted by CGH, wave front conversion can be achieved with little loss of energy of entering light wave. The CGH which generates uniform intensity distribution or simple shape intensity distribution can be appropriately used as a component of the lighting device. The CGH which freely establishes divisional regions of diffraction gratings is appropriate since no problem is caused by aberration.

As discussed above, the lighting device 1 including the diffraction optical element 10 provides high light utilization efficiency even when the diffraction optical element 10 is shifted from the predetermined position. Thus, light having high brightness can be applied to the illumination area S of the predetermined surface 3a.

According to this embodiment, a part of the second area B illuminated by illumination light applied via the second diffraction pattern 12 overlaps with the first area A illuminated by illumination light applied via the first diffraction pattern 11. However, the first area A illuminated by light applied via the first diffraction pattern 11 may be an area completely different from the second area B illuminated by light applied via the second diffraction pattern 12.

The second diffraction pattern 12 disposed adjacent to the first diffraction pattern 11 may be provided only on a part of the entire circumference of the first diffraction pattern 11. When the second diffraction pattern 12 is provided only in the direction where positional shift is easily produced, for example, the manufacture cost of the diffraction optical element 10 lowers due to simplified design. The second diffraction pattern 12 may be provided only on one of the opposed sides of the outer circumferential sizes of the first diffraction pattern 11. This structure can be employed when the diffraction optical element 10 is shifted in the left-right or up-down direction (two-dimensional direction).

According to this embodiment, the respective regions P1 through P4 are disposed such that the illumination direction of the second area B with respect to the first area A is the same as the formation direction of the second diffraction pattern 12 with respect to the first diffraction pattern 11. However, the second diffraction pattern of the diffraction optical element may have an illumination position corresponding to the downward shift of the diffraction optical element 10 which achieves illumination of an area above the illumination area S.

According to this embodiment, the second diffraction pattern 12 of the diffraction optical element 10 is designed such that the distance L1 becomes equal to the distance L2 as the difference in the illumination area. However, the distance L1 may be different from the distance L2. The light utilization efficiency increases in this condition, but becomes the maximum when the distance L1 is equal to the distance L2.

Modification of First Embodiment

Figure 6:
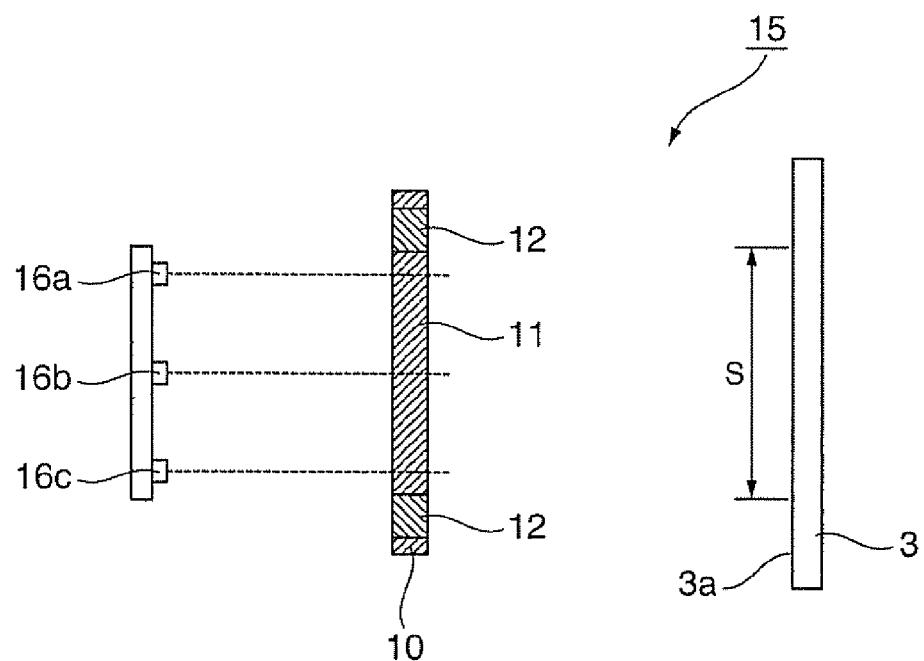
FIG. 6 is a cross-sectional view of a main part of a lighting device according to a modified example of the first embodiment of the invention.
Figure 7:
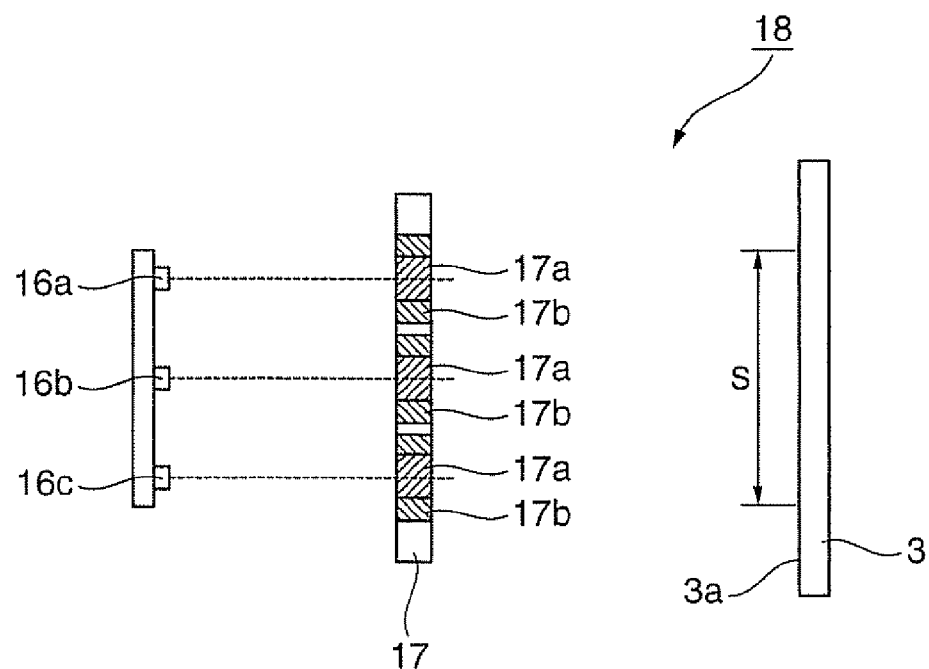
FIG. 7 is a cross-sectional view of a main part of a lighting device according to another modified example of the first embodiment of the invention.

While the light source device 2 has one light mission unit in the first embodiment shown in FIG. 1, the light source device 2 of a lighting device 15 shown in FIG. 6 may includes a plurality of light emission units 16a, 16b and 16c (three in the example shown in the figure).

The diffraction optical element 10 included in the lighting device 15 has the first diffraction pattern 11 having a sufficient size for receiving laser beams emitted from the plural light emission units 16a, 16b and 16c. Thus, the laser beam shifted out of the first diffraction pattern 11 due to shift of the diffraction optical element 10 enters the second diffraction pattern 12 to illuminate the illumination area S of the predetermined surface 3a. According to this structure, the size of the first diffraction pattern 11 can be determined according to the positions of the plural light emission units 16a through 16c. Thus, the manufacture cost can be reduced by simplification of the design.

When the light source device 2 has the plural light emission units 16a, 16b and 16c, a lighting device 18 having a diffraction optical element 17 which is provided with three first diffraction patterns 17a provided for the light emission units 16a, 16b and 16c in one-to-one correspondence may be employed in place of the lighting device 15. The diffraction optical element 17 has second diffraction patterns 17b on the circumferences of the first diffraction patterns 17a. According to this structure, the first and second diffraction patterns 17a and 17b are provided for all the light emission units, and thus lights emitted from the light emission units 16a through 16c enter the second diffraction patterns 17b when the diffraction optical element 17 is shifted. Accordingly, the light utilization efficiency becomes higher than that of the lighting device 15 shown in FIG. 6.

According to the lighting devices 15 and 18, one substrate of the light source device 2 has the plural light emission units 16a, 16b and 16c. However, each of the light emission units 16a, 16b and 16c may be separately provided on the corresponding light source device 2.

Second Embodiment

A second embodiment according to the invention is now described with reference to FIGS. 8 through 10. In the following description of the respective embodiments, similar reference numbers are given to parts having structures similar to those of the parts of the lighting device 1 in the first embodiment, and the same explanation is not repeated.

A lighting device 20 according to this embodiment is different from the lighting device 1 having the diffraction optical element 10 in the first embodiment in that the lighting device 20 has a second diffraction pattern 27.

Figure 8:
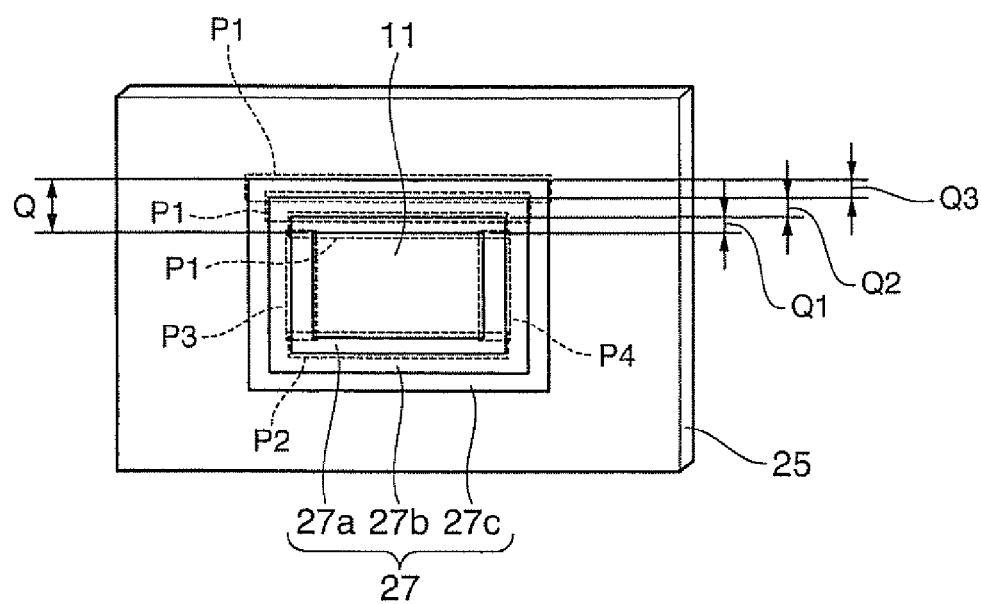
FIG. 8 is a plan view illustrating a diffraction optical element according to a second embodiment of the invention.

As illustrated in FIG. 8, the second diffraction pattern 27 has three narrow sub diffraction patterns 27a, 27b and 27c disposed in this order from the first diffraction pattern 11. That is, the width Q of the second diffraction pattern 12 of the diffraction optical element 10 in the first embodiment is approximately three times larger than the entering laser beam, but each of widths Q1, Q2 and Q3 of the sub diffraction patterns 27a through 27c of the second diffraction pattern 27 of a diffraction optical element 25 in the second embodiment is about one third of the width Q. More specifically, each of the widths Q1 Q2 and Q3 of the sub diffraction patterns 27a through 27c are substantially the same length as the beam diameter of the entering laser beam.

As illustrated in FIG. 8, the sub diffraction pattern 27a of the second diffraction pattern 27 is disposed adjacent to the circumference of the first diffraction pattern 11 in a frame shape. The sub diffraction pattern 27b is disposed adjacent to the circumference of the sub diffraction pattern 27a in a frame shape. Similarly, the sub diffraction pattern 27c is disposed adjacent to the circumference of the sub diffraction pattern 27b in a frame shape.

The sub diffraction patterns 27a through 27c are divided into four regions P1 through P4 in the up-down and left-right directions with respect to the first diffraction pattern 11 similarly to the second diffraction pattern 12 in the first embodiment.

Figure 9:
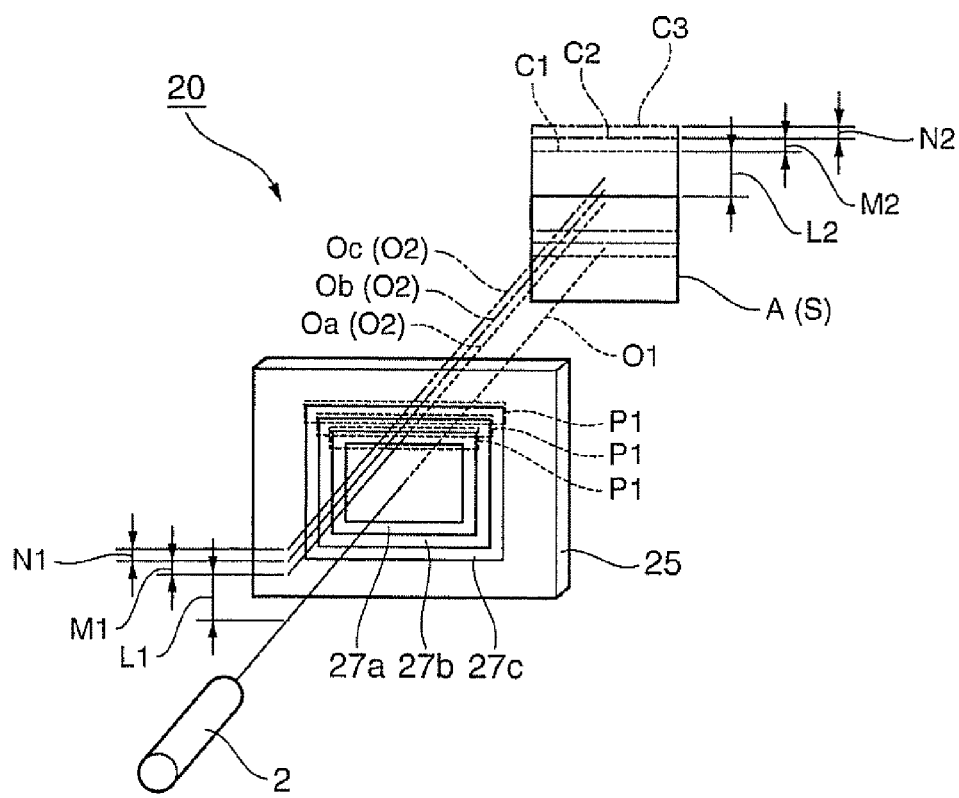
FIG. 9 is a perspective view illustrating an illumination area when light enters a second diffraction pattern of a diffraction optical element shown in FIG. 8.
Figure 10:
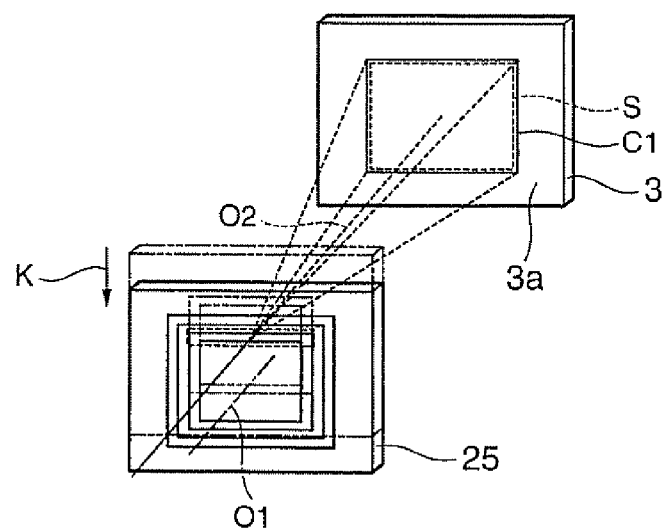
FIG. 10 is a perspective view showing operation of the diffraction optical element shown in FIG. 8.

Illumination light generated through the region P1 of the regions P1 through P4 included in each of the sub diffraction patterns 27a through 27c is now described as an example with reference to FIG. 9.

For simplifying explanation of illumination light as laser beam entering the second diffraction pattern 27, the position of the center axis O2 of the light entering the diffraction optical element 25 is changed. However, the positional relationship between the light source device 2 and the illumination area S of the predetermined surface 3a is actually fixed.

As illustrated in FIG. 9, laser beam (chain line) emitted from the light source device 2 and entering the upper region P1 of the sub diffraction pattern 27a illuminates a second area C1 above the first area A such that a part of the second area C1 overlaps with the first area A. Similarly, laser beam (alternate long and short dash line) emitted from the light source device 2 and entering the upper region P1 of the sub diffraction pattern 27b illuminates a second area C2 above the first area A such that a part of the second area C2 overlaps with the first area A. Similarly, laser beam (alternate long and two short dashes line) emitted from the light source device 2 and entering the upper region P1 of the sub diffraction pattern 27c illuminates a second area C3 above the first area A such that a part of the second area C3 overlaps with the first area A.

Similarly to the first embodiment, the sub diffraction pattern 27a in the region P1 is designed such that the distance L1 between the center of the first diffraction pattern 11 and the region P1 of the sub diffraction pattern 27a becomes approximately equal to the difference L2 between the upper ends of the illumination areas of the first area A and the second area C1.

Also, the sub diffraction pattern 27b in the region P1 is designed such that a distance M1 between the center axis Oa of the sub diffraction pattern 27a and a center axis Ob of the sub diffraction pattern 27b becomes substantially equal to a difference M2 between the upper ends of the illumination areas of the second area C1 and the second area C2. Similarly, the sub diffraction pattern 27c in the region P1 is designed such that a distance N1 between the center axis Ob of the sub diffraction pattern 27b and a center axis Cc of the sub diffraction pattern 27c becomes substantially equal to a difference N2 between the upper ends of the illumination areas of the second area C2 and the second area C3.

The regions P2 through P4 of the sub diffraction patterns 27a through 27c of the second diffraction pattern 27 are designed in the same manner.

The operation of the lighting device 20 having this structure in the embodiment is now described.

Laser beam emitted from the light source device 2 enters the first diffraction pattern 11 of the diffraction optical element 25. Then, the illumination light diffracted by the first diffraction pattern 11 illuminates the illumination area S of the predetermined surface 3a. In this step, the center axis O1 of the diffraction optical element 25 is shifted from the center axis O2 of the entering laser beam in the downward direction of the diffraction optical element 25 (direction indicated by an arrow K) due to change with time as illustrated in FIG. 10, for example. The laser beam shifted out of the first diffraction pattern 11 enters the sub diffraction pattern 27a of the second diffraction pattern 27.

In this case, the laser beam having entered the sub diffraction pattern 27a of the second diffraction pattern 27 illuminates the second area C1 above the first illumination area A to be illuminated by illumination light via the first diffraction pattern 11. Thus, the laser beam illuminates the illumination area S of the predetermined surface 3a by the positional shift of the diffraction optical element 25. With further shift of the position of the diffraction optical element 25, the laser beam enters the sub diffraction pattern 27b, and then the sub diffraction pattern 27c. Thus, the laser beam entering the sub diffraction patterns 27b and 27c illuminates the illumination area S even when the position of the diffraction optical element 25 changes.

According to the first embodiment, the structure is designed such that laser beam having entered any position of the second diffraction pattern 12 illuminates the second illumination area B regardless of the distance from the center axis O1. Thus, there is a possibility that the laser beam illuminates an area slightly shifted from the illumination area S depending on the position of the laser beam entering the second diffraction pattern 27. In this case, slight loss of the light amount is produced. According to the diffraction optical element 25 in this embodiment, however, the second diffraction pattern 27 is divided into the three sub diffraction patterns 27a through 27c. Thus, the illumination area S of the predetermined surface 3a can be illuminated by the laser beam entering any position of the second diffraction pattern 27. Accordingly, utilization efficiency of the laser beam emitted from the light source device 2 considerably increases.

Each of the widths of the sub diffraction patterns 27a through 27c is not limited to one third of the width Q of the second diffraction pattern 12 of the diffraction optical element 10 in the first embodiment. More specifically, while each of the widths Q1, Q2 and Q3 of the sub diffraction patterns 27a through 27c is substantially equal to the beam diameter of the entering laser beam, each width is preferably smaller than the spot diameter of the entering laser beam. In this case, the light shifted out of the sub diffraction pattern enters another sub diffraction pattern. Thus, illumination light for illuminating the first area A can be generated from entering light with only small loss of the light.

The number of the sub diffraction patterns 27a through 27c is not limited to three, but may be two, four or more according to the degree of shift of the diffraction optical element 25, the beam diameter or other conditions.

In this embodiment, the second diffraction pattern 27 of the diffraction optical element 25 is designed such that the distances L1, M1 and N1 become equal to the difference L2 in the illumination area, the difference M2 in the illumination area, and the difference N2 in the illumination area. However, the second diffraction pattern 27 may be designed otherwise.

Third Embodiment

Figure 11:
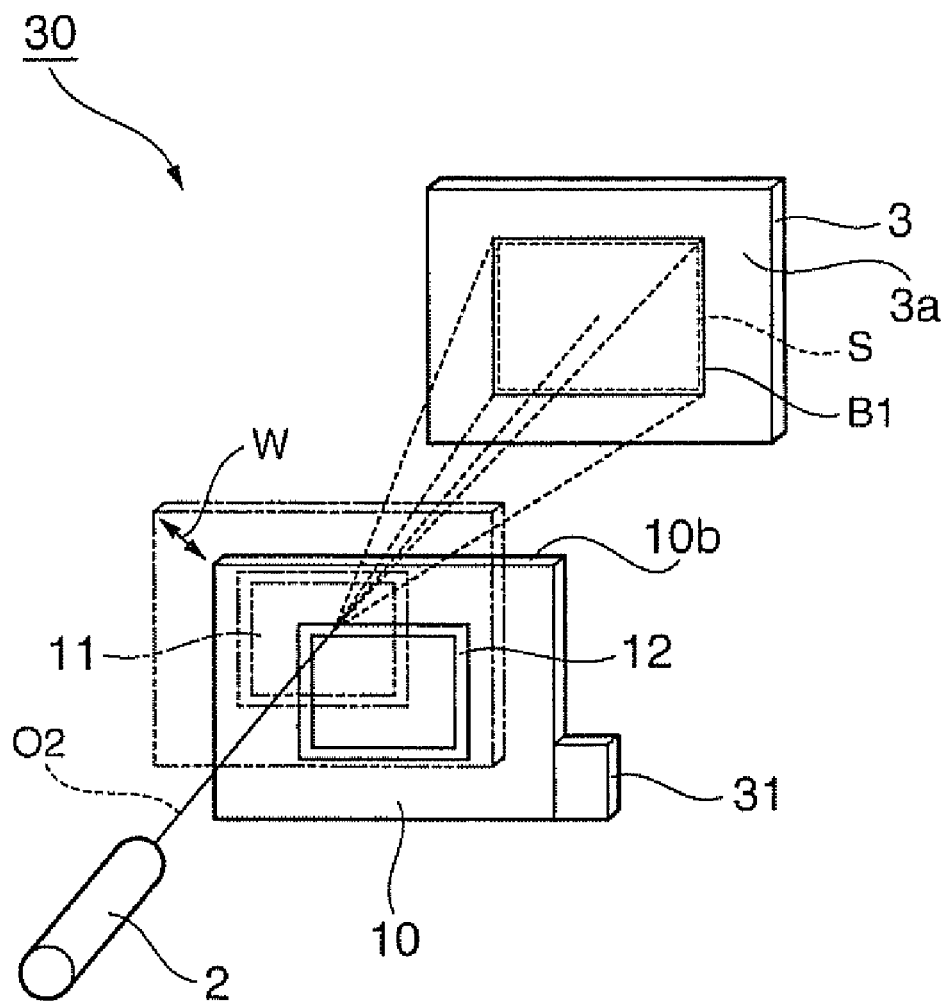
FIG. 11 is a plan view illustrating a diffraction optical element according to a third embodiment of the invention.

A third embodiment according to the invention is now described with reference to FIG. 11.

A lighting device 30 in this embodiment is different from the lighting device 1 in the first embodiment in that a movable member 31 for moving the diffraction optical element 10 is provided.

The movable member (shift unit) 31 shifts (oscillates) the diffraction optical element 10 on the plane perpendicular to the center axis O2 of laser beam emitted from the light source device 2. More specifically, the movable member 31 reciprocates the diffraction optical element 10 in the direction inclined to an upper end surface 10b of the diffraction optical element 10 at 45 degrees (direction indicated by an arrow w).

The movable member 31 shifts the diffraction optical element 10 such that the laser beam emitted from the light source device 2 can enter the first diffraction pattern 11 and the second diffraction pattern 12 of the diffraction optical element 10. More specifically, the movable member 31 shifts the diffraction optical element 10 such that the laser beam enters the area within the second diffraction pattern 12 (such that the laser beam does not enter an area out of the second diffraction pattern 12).

According to the lighting device 30 in this embodiment which includes the movable member 31 for shifting the diffraction optical element 10, the speckle pattern of the laser beam released from the diffraction optical element 10 varies with time. In this case, the speckle pattern of the light released from the diffraction optical element 10 is integrated due to after image effect, and scintillation of the light is thus reduced. Thus, speckle contrast of the laser beam emitted from the lighting device 30 can be decreased.

Particularly, a portion of the illumination area S of the predetermined surface 3a which is not illuminated can be reduced by shifting the diffraction optical element 10 until light enters the second diffraction pattern 12 by using the movable member 31. Thus, the entire illumination area S of the predetermined surface 3a can be illuminated.

The shift direction of the diffraction optical element 10 shifted by the movable member 31 is not limited to reciprocating movement as discussed above, but may be circular movement, or along elliptic or random track. Particularly, the diffraction optical element 10 produces no dead point (point at which movement stops for an instant) when shifted successively. In this case, no interference is produced at any moment. Thus, the advantage of preventing flicker-like speckles (flickering of images on the screen) can be provided at all times.

While the movable member 31 oscillates the diffraction optical element 10 such that laser beam can enter the second diffraction pattern 12, the movable member 31 may oscillate the diffraction element 10 such that laser beam enters only the first diffraction pattern 11.

Fourth Embodiment

A fourth embodiment according to the invention is now described with reference to FIG. 12.

Figure 12:
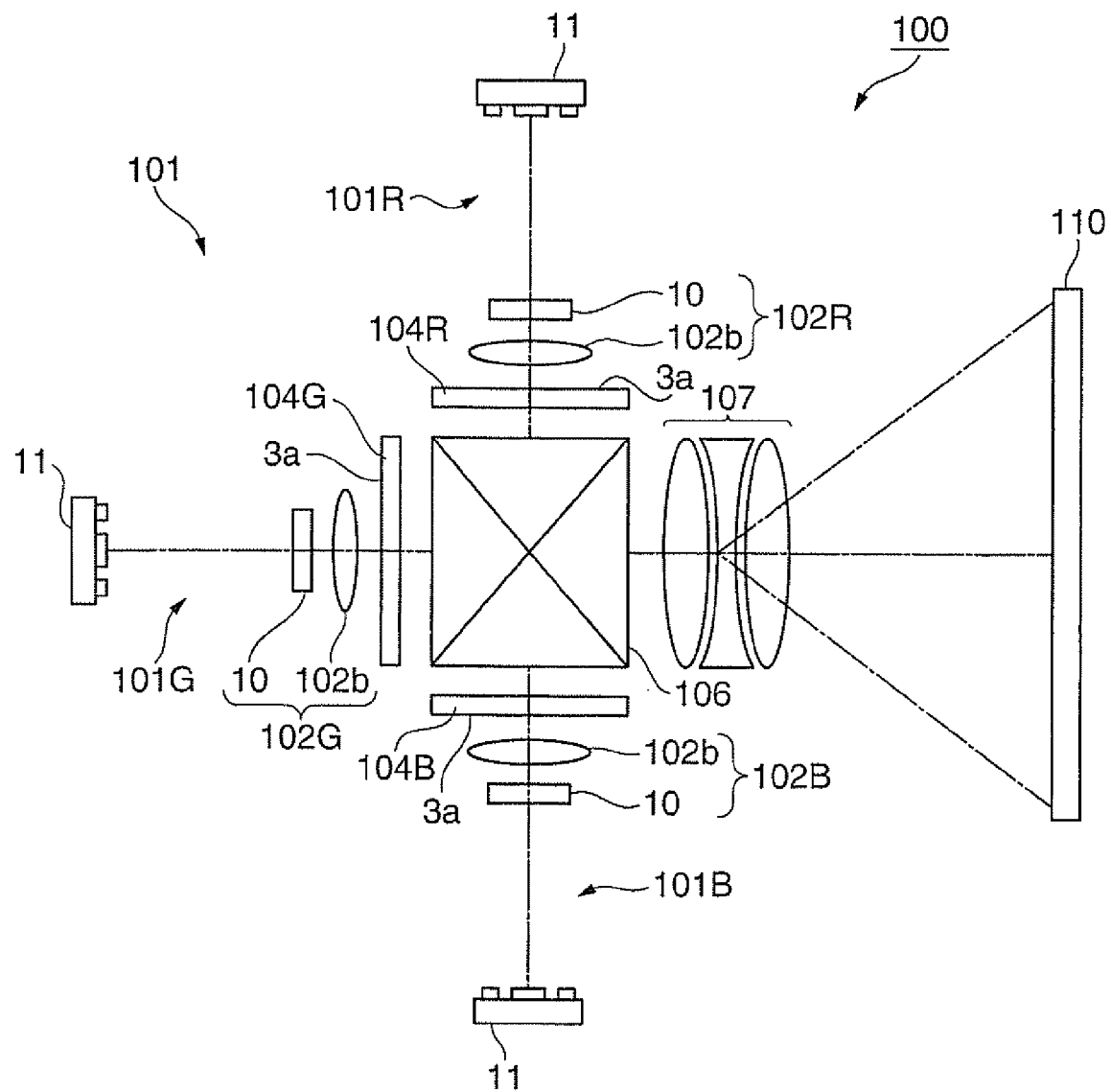
FIG. 12 is a plan view illustrating a general structure of a projector according to a fourth embodiment of the invention.
Figure 13A:
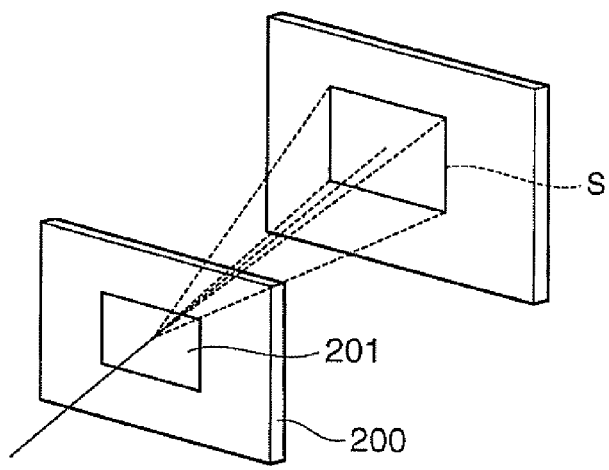
FIGS. 13A through 13C are perspective views each of which illustrates an illumination area when light enters a diffraction optical element in a related art.
Figure 13B:
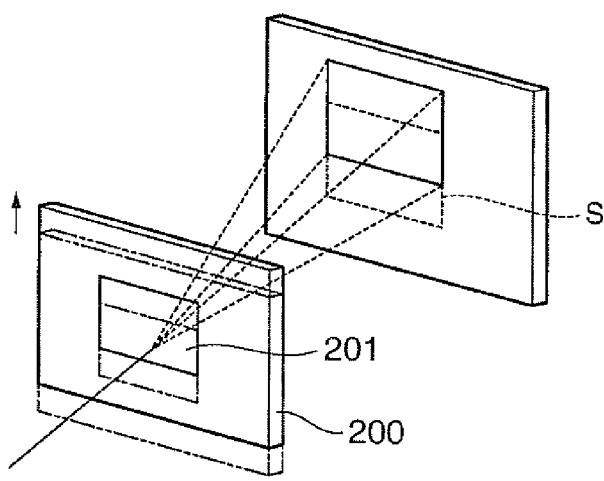
Figure 13C:
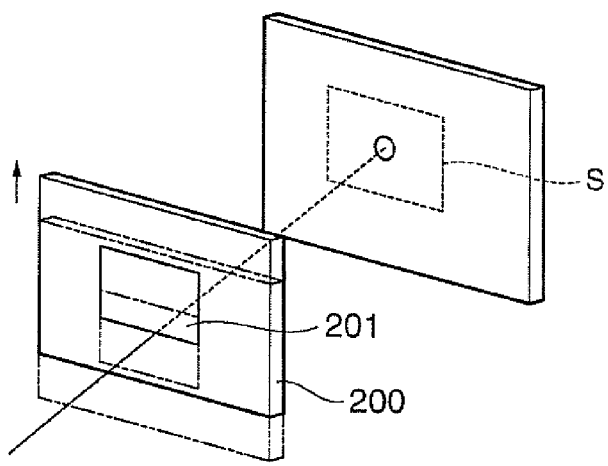

In FIG. 12, a housing included in a projector 100 is not shown for simplifying explanation.

Each of red lighting device 101R, green lighting device 101G, and blue lighting device 101B for emitting red light, green light, and blue light included in a lighting device 101 of the projector 100 is constituted by the lighting device 1 according to the first embodiment described above.

The projector 100 includes liquid crystal light valves (light modulation devices) 104R, 104G and 104B for modulating laser beams emitted from the lighting devices 101R, 101G and 101B, a cross dichroic prism (color combining unit) 106 for combining the lights released from the liquid crystal light valves 104R, 104G and 104B and guiding the combined light to a projection lens 107, and the projection lens (projection device) 107 for enlarging an image produced by the liquid crystal light valves 104R, 104G and 104B and projecting the enlarged image on a screen 110.

The predetermined surface 3a of the lighting device 1 in the first embodiment corresponds to light receiving end surfaces of the liquid crystal light valves 104R, 104G and 104B.

The projector 100 has equalizing systems 102R, 102G and 102B for equalizing illuminance distribution of the laser beams emitted from the lighting devices 101R, 101G and 101B at positions downstream from the lighting devices 101R, 101G and 101B. The projector 100 illuminates the liquid crystal light valves 104R, 104G and 104B by the lights having equalized illuminance thus produced. The equalizing systems 102R, 102G and 1023 are constituted by the diffraction optical elements 10 and field lenses 102b, for example.

Three color lights modulated by the liquid crystal light valves 104R, 104G and 1043 enter the cross dichroic prism 106. This prism 106 is formed by affixing four rectangular prisms, and contains dielectric multilayer film for reflecting red light and dielectric multilayer film for reflecting blue light disposed in a cross shape on the inner surface of the prism 106. The three color lights are combined by these dielectric multilayer films to produce light representing a color image. The combined light is projected on the screen 110 via the projection lens 107 as the projection system to display an enlarged image.

The projector 100 in this embodiment can project an image having high brightness on the screen 110 even when the diffraction optical elements 10 of the red lighting device 101k, green lighting device 101G, and blue lighting device 101B are shifted from the center axis O1 due to their high light utilization efficiency. Thus, reliability of the projector 100 improves.

Moreover, the light released from the screen 110 has reduced scintillation when the lighting device 30 in the third embodiment is used. In this case, the projector 100 can display high-quality images.

While the red, green and blue light illumination devices 101R, 101G and 101B are constituted by the lighting devices 1 in the first embodiment in the projector according to this embodiment, they may be constituted by the lighting devices 20 or 30 shown in the second embodiment or third embodiment (including the modified example). In this case, different lighting device may be used for each of the lighting devices 101R, 101G and 101B, or the same lighting devices may be used for all the lighting devices.

While the transmission type liquid crystal light valves are used as the light modulation devices, light valves other than the liquid crystal light valves may be used. For example, reflection type light valves may be employed. Examples of these light valves involve reflection type liquid crystal light valves, digital micromirror devices, and other types. The structure of the projection system is appropriately determined according to the types of the light valves to be used.

The lighting devices according to the first through third embodiments (including the modified example) may be included in a light source device of a scan-type image display apparatus.

The technical scope of the invention is not limited to the embodiments described and depicted herein, and it is thus intended that various modifications and changes may be made without departing from the scope and spirit of the invention.

For example, when the shift of the light source device is larger than the shift of the diffraction optical element with respect to the illumination area, decrease in the light utilization efficiency can be prevented by setting the size of the first diffraction pattern larger than the spot diameter of the laser beam even when the diffraction optical element is shifted.

On the other hand, when the shift of the diffraction optical element is larger than the shift of the light source device with respect to the illumination area, decrease in the light utilization efficiency can be prevented by setting the width of the first diffraction pattern on the plane in the shorter side direction (in the transverse direction) substantially equivalent to the spot diameter of the laser beam.

While the color light combining unit is constituted by the cross dichroic prism in the fourth embodiment, it may be a unit having dichroic mirrors disposed in cross shape for combining color lights, or a unit having dichroic mirrors disposed in parallel for combining color lights.

The entire disclosure of Japanese Patent Application No. 2007-097193, filed Apr. 3, 2007 is expressly incorporated by reference herein.

What is claimed is:

1. A diffraction optical element, comprising:
a first diffraction pattern which diffracts entering light from a light source device to produce illumination light for illuminating a first area on a side of the first diffraction pattern opposite to the entering light; and
a second diffraction pattern which is disposed adjacent to the first diffraction pattern and contacts the first diffraction pattern, and diffracts entering light from the light source device to produce illumination light for illuminating a second area on a side of the second diffraction pattern opposite to the entering light other than the first area by using at least a part of diffracted light,
wherein the second diffraction pattern is disposed along a circumference of the first diffraction pattern.

2. The diffraction optical element according to claim 1, wherein the second diffraction pattern is disposed in such a position that the illumination position of the second area with respect to the first area is located on the same side as that of the formation area of the second diffraction pattern with respect to the first diffraction pattern.

3. The diffraction optical element according to claim 1, wherein a width of the first diffraction pattern in a transverse direction of the first area is substantially equal to a spot diameter of the entering light.

4. The diffraction optical element according to claim 1, wherein:
the second diffraction pattern has a plurality of sub diffraction patterns; and
each of the sub diffraction patterns produces illumination light applied to an area different from one another.

5. The diffraction optical element according to claim 4, wherein each width of the sub diffraction patterns in a direction crossing a center axis of entering light is smaller than the spot diameter of the entering light.

6. The diffraction optical element according to claim 1, wherein:
the first diffraction pattern has a rectangular shape; and
the second diffraction pattern is provided at least one of the opposed sides on the outer circumference of the first diffraction pattern.

7. A lighting device, comprising:
the light source device which emits light; and
the diffraction optical element according to claim 1 which diffracts light emitted from the light source device,
wherein the diffraction optical element produces illumination light for illuminating a predetermined illumination area.

8. The lighting device according to claim 7, further comprising:
a shift unit which shifts the diffraction optical element on the plane perpendicular to a center axis of entering light,
wherein the shift unit shifts the diffraction optical element such that light emitted from the light source device enters the first diffraction pattern and the second diffraction pattern.

9. The lighting device according to claim 7, wherein the diffraction optical element is a hologram element.

10. The lighting device according to claim 7, wherein:
the light source device includes a plurality of light emission units that each emit light; and
the first diffraction pattern of the diffraction optical element has a size sufficient for receiving the plural lights.

11. The lighting device according to claim 7, wherein:
the light source device includes a plurality of light emission units that each emit light; and
the first diffraction pattern and the second diffraction pattern of the diffraction optical element are provided for each of the plural lights.

12. A projector, comprising:
the lighting device according to claim 7;
a light modulation device which modulates light emitted from the lighting device according to an image signal; and
a projection device which projects an image formed by the light modulation device.

13. The diffraction optical element according to claim 1, wherein the second diffraction pattern is disposed along the circumference of the first diffraction pattern in a frame shape.

* * * * *